United States Patent
Nakatake et al.

(10) Patent No.: US 9,270,147 B2
(45) Date of Patent: Feb. 23, 2016

(54) STATOR AND PROTECTING MEMBER FOR STATOR

(71) Applicant: SANYO DENKI CO., LTD., Tokyo (JP)

(72) Inventors: Kouji Nakatake, Tokyo (JP); Yukio Miura, Tokyo (JP); Masaaki Ohashi, Tokyo (JP); Zhang Hong, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 170 days.

(21) Appl. No.: 13/720,207

(22) Filed: Dec. 19, 2012

(65) Prior Publication Data

US 2013/0154433 A1    Jun. 20, 2013

(30) Foreign Application Priority Data

Dec. 20, 2011  (JP) ................. 2011-278701

(51) Int. Cl.
*H02K 3/34*   (2006.01)
*H02K 3/32*   (2006.01)
*H02K 3/52*   (2006.01)

(52) U.S. Cl.
CPC ............. *H02K 3/345* (2013.01); *H02K 3/325* (2013.01); *H02K 3/522* (2013.01)

(58) Field of Classification Search
CPC .......... H02K 3/34; H02K 3/345; H02K 3/325
USPC .................................. 310/214, 215
See application file for complete search history.

(56) References Cited

U.S. PATENT DOCUMENTS

| | | | |
|---|---|---|---|
| 2006/0022549 A1* | 2/2006 | Otsuji .......................... | 310/216 |
| 2007/0194653 A1* | 8/2007 | Prokscha et al. ............. | 310/218 |
| 2008/0315710 A1* | 12/2008 | Morioka et al. ............. | 310/217 |
| 2009/0324435 A1* | 12/2009 | Sears et al. ................. | 417/423.7 |
| 2010/0213784 A1 | 8/2010 | Iizuka et al. | |
| 2014/0159539 A1* | 6/2014 | Iwase et al. ................. | 310/215 |

FOREIGN PATENT DOCUMENTS

| | | |
|---|---|---|
| CN | 201590691 U | 9/2010 |
| CN | 201590692 U | 9/2010 |

(Continued)

OTHER PUBLICATIONS

Notice of Reasons for Refusal for Japanese Patent Application No. 2011-278701 mailed on Jan. 20, 2015.
Chinese Office Action issued on Jun. 11, 2015 for the corresponding Chinese Patent Application No. 201210557011.0 (6 pages).
European Search Report issued Jun. 19, 2015 for the corresponding European Patent Application No. 12196745.9 (8 pages).

(Continued)

*Primary Examiner* — Hanh Nguyen
(74) *Attorney, Agent, or Firm* — Novak Druce Connolly Bove + Quigg LLP

(57) ABSTRACT

There is provided a stator that can suppress degradation in insulating performance and electrical strength performance, shorten a work time, and improve winding efficiency and heat radiation. The stator 1 includes a yoke part 20 formed to be annular, a plurality of tooth parts 30 protruding from the yoke part 20 in an inward direction perpendicular to an axial direction O of a rotor when the rotor is arranged in the yoke part 20, and protecting members 40 each of which is attached to both end surfaces of the tooth part 30 in the axial direction O to protect a corner of the tooth part 30. The protecting members 40 have a length in a slot 38 between the tooth parts 30 shorter than a half of an entire length of the tooth part 30 in the axial direction.

8 Claims, 4 Drawing Sheets

(56) References Cited

FOREIGN PATENT DOCUMENTS

| JP | 2002112487 A | 4/2002 |
|---|---|---|
| JP | 2009-038918 A | 2/2009 |
| JP | 2010004637 A | 1/2010 |
| JP | 2010279241 A | 12/2010 |

OTHER PUBLICATIONS

Japanese Notice of Reason for Refusal issued on Jul. 28, 2015 for the corresponding Japanese Patent Application No. 2011-278701 (2 pages).

* cited by examiner

STATOR AND PROTECTING MEMBER FOR STATOR

CROSS-REFERENCE TO RELATED APPLICATIONS

This application claims benefit, under 35 U.S.C. § 119(e), to Japanese Application No. 2011-278701, filed Dec. 20, 2011, the entirety of which is incorporated herein by reference.

BACKGROUND

1. Technical Field

The present invention relates to a stator that is provided in an electric motor, and relates to a protecting member for a stator.

2. Description of Related Art

A stator provided in an electric motor is usually formed by stacking a plurality of steel plates, and includes teeth for winding an electric wire. Between the electric wire and the stator, insulation needs to be maintained. For this purpose, in some cases, an exposing part of the stator is coated with an insulating material, and the electric wire is coated with an insulating material to secure an insulation property. The electric wire is wound around the teeth of the stator coated with the insulating material.

When the electric wire is wound, the electric wire is pressed into edge portions of the teeth of the stator, and this results in degrading insulating performance and reducing electrical strength. In light of it, a thickness of the insulating coat formed on the stator is required to be large. As a result, a slot where the electric wire wound around the stator is accommodated is made small (wire-winding space is made small) to reduce the efficiency of the wound wire.

In view of it, a stator described in Japanese Patent Application Laid-Open Publication No. 2010-279241 is coated with a resinous insulating member at the portion contacting with an electric wire such that the electric wire does not contact directly with the stator.

However, according to Japanese Patent Application Laid-Open Publication No. 2010-279241, the insulating member is molded in conformity with the shapes of the tooth part and the slot, and the resinous member is inserted into the slot of the stator so as to cover the portion where the electric wire is wound. This technique requires a process of inserting the insulating member, and the work takes time. Furthermore, the insulating member protects the stator over the entire length of the slot in the direction of stacking steel plates, so that when the number of the stacking steel plates is changed, the shape of the insulating member also needs to be changed. This increases a cost of the insulating member. In addition, the insulating member is provided in the slot, so that the region where the electric wire is wound is limited to be narrow. As a result, a winding efficiency is reduced. Furthermore, the insulating member is provided between the stator and the electric wire, so that it becomes difficult for the heat to transmit to the stator from the electric wire that generates heat due to an electric current flowing therethrough. As a result, heat radiation performance is degraded.

SUMMARY

The present invention has been made in order to solve the problems existing in the above-described background. It is an object of the present invention to provide a stator and a protecting member for a stator, being able to suppress degradation in insulating performance and electrical strength performance, to shorten a work time and to improve winding efficiency and heat radiation.

A stator to attain the above-described object includes a yoke part, a plurality of tooth parts, and a protecting member. The yoke part is formed to be annular. A plurality of the tooth parts protrude from the yoke part in an inward direction perpendicular to an axial direction of a rotor (running body) when the rotor is arranged in the yoke part. The protecting member is attached to both end surfaces of one of the tooth parts in the axial direction to protect a corner of one of the tooth parts. The protecting member has a length in a slot between the tooth parts, shorter than a half of an entire length of the tooth parts in the axial direction.

A protecting member for a stator is attached to the stator including a yoke part formed to be annular, and including a plurality of tooth parts protruding from the yoke part in an inward direction perpendicular to an axial direction of a rotor when the rotor is arranged in the yoke part. The protecting member is attached to both end surfaces of one of the tooth parts in the axial direction to protect a corner of one of the tooth parts, the protecting member having a length in a slot between the tooth parts, shorter than a half of an entire length of the tooth parts in the axial direction.

The objects, features, and characteristics of this invention other than those set forth above will become apparent from the description given herein below with reference to preferred embodiments illustrated in the accompanying drawings.

DETAILED DESCRIPTION

In the following, embodiments of the present invention will be described with reference to the drawings.

Figure 1:
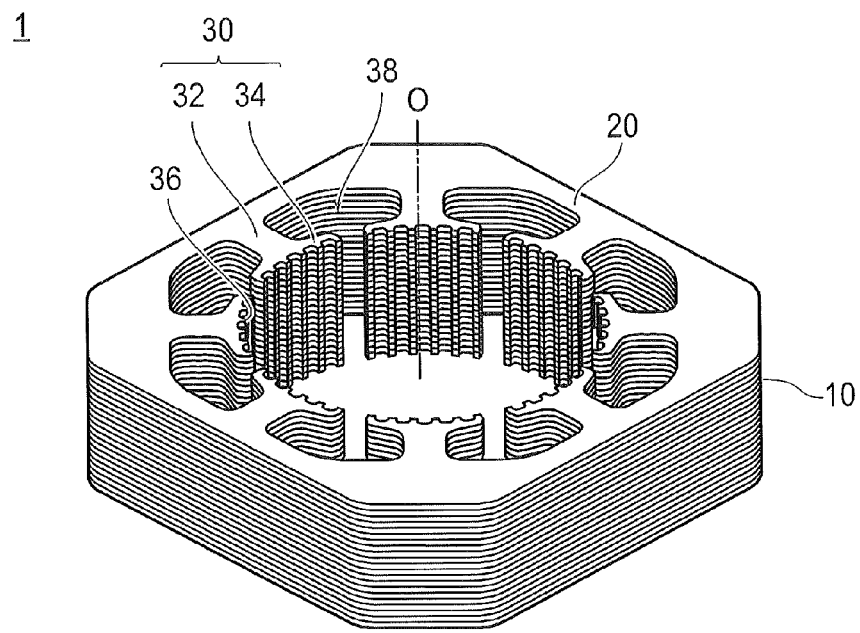
FIG. 1 is a perspective view illustrating a stator according to the present embodiment.
Figure 2:
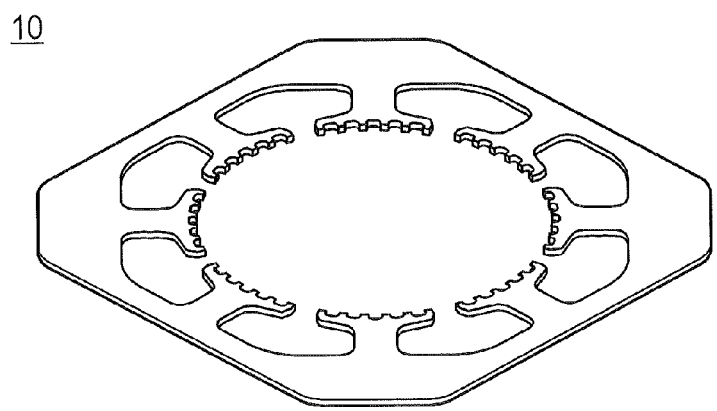
FIG. 2 is a perspective view illustrating a steel plate constituting the stator.

FIG. 1 is a perspective view illustrating a stator according to the present embodiment, and FIG. 2 is a perspective view illustrating a steel plate constituting the stator.

As illustrated in FIG. 1, the stator 1 according to the present embodiment is formed by stacking a plurality of steel plates 10, and fixing the steel plates to one another by means of an adhesive, caulking or the like. The stator 1 includes a yoke part 10 and a tooth part 30, and the entire of the stator 1 is coated with a resin. The yoke 20 is formed to have an annular shape so that a rotor (not illustrated) can be arranged in the inside of the yoke 20. The tooth part 30 protrudes inwards from the yoke part 20 along the direction perpendicular to the axial direction O of the rotor in the state where the rotor has been arranged in the yoke 20. In the present specification, a radial inward direction of the annular yoke part 20 is referred to as "inward direction", a radial outward direction of the yoke part 20 is referred to as "outward direction," a direction in which the yoke part 20 annularly extends (direction in which a plurality of tooth parts 30 are arranged) is referred to as "circumferential direction," and a direction (the direction of the rotational axis O of the electric motor) in which the steel plates 10 are stacked is referred to as "stacking direction."

The tooth part 30 is a part around which an electric wire is wound. A plurality of the tooth parts 30 are arranged in the circumferential direction. The tooth part 30 includes a tooth winding portion 32 around which the electric wire is actually wound, and a tooth end portion 34 formed on the inward side of the tooth winding portion 32. The tooth end portion 34 is formed so as to extend, from the tooth winding portion 32, in the both direction toward the neighboring other tooth parts 30. On the inward side of the tooth end portion 34, there is formed an arc-shaped gap surface 36 that faces the rotor (not illustrated) when the electric motor is configured. Between the tooth winding portions 32, there is formed a slot 38 accommodating the wound electric wire.

Figure 3:
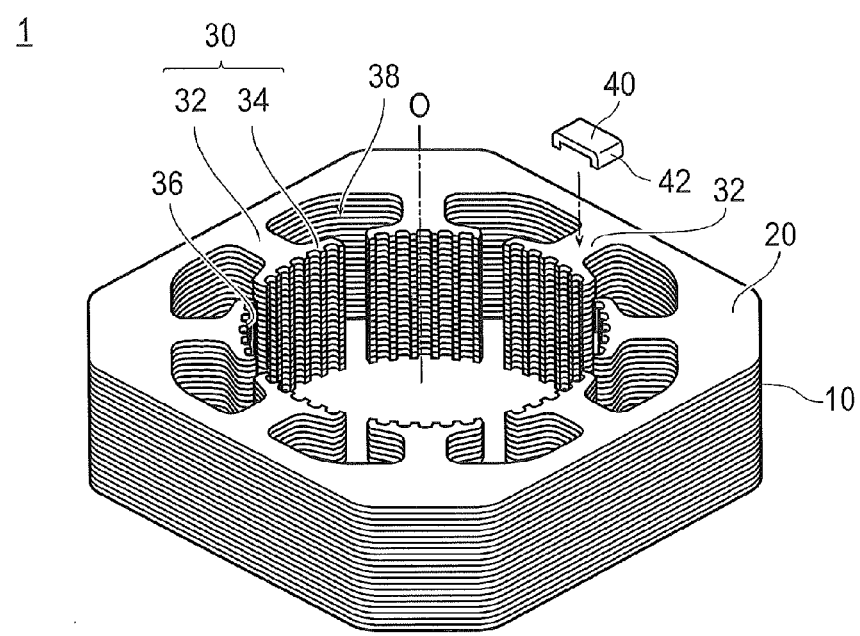
FIG. 3 illustrates a protecting member that is being attached to the stator.
Figure 4:
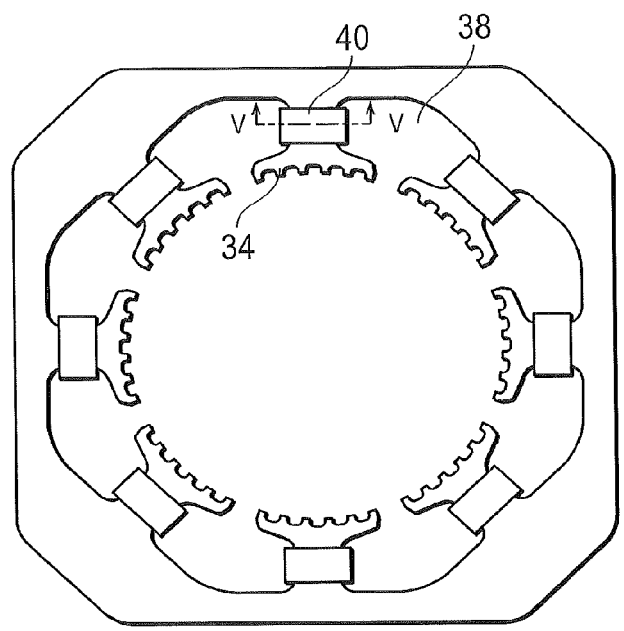
FIG. 4 is a plan view of the stator to which the protecting member for the stator has been attached.
Figure 5:
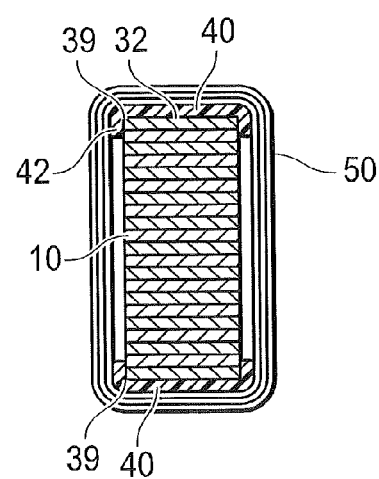
FIG. 5 is a sectional view along the V-V line in FIG. 4 in the state where an electric wire has been wound around the stator.

FIG. 3 illustrates a manner of attaching, to the stator, a protecting member for the stator, FIG. 4 is a plan view of the stator to which the protecting member for the stator has been attached, and FIG. 5 is a sectional view along the V-V line in FIG. 4 in the state where an electric wire has been wound around the stator.

According to the present embodiment, as illustrated in FIG. 3, the tooth part 30 of the stator 1 has both end surfaces in the stacking direction to each of which the protecting member 40 for the stator is attached. The protecting member 40 for the stator is formed of an insulating material such as a resin, and is attached to the tooth part 30 by means of an adhesive. As illustrated in FIG. 4, the protecting members 40 for the stator are attached to the all tooth parts 30, and cover corners 39 (refer to FIG. 5) of the tooth winding portions 32 of the tooth parts 30. The protecting member 40 for the stator is formed to have U-shape and bridges the both slots adjacent to the tooth part 30. The end portions 42 of the protecting member 40 for the stator are inserted and located in the slots 38 respectively. The end portions 42 to be inserted are shorter than a half of the entire length of the slot 38 in the stacking direction, i.e., are shorter than a half of the entire length of the tooth part 30 in the stacking direction. As illustrated in FIG. 5, the end portions 42 do not cover the entire length of the tooth part 30 even when considering another protecting member 40 for the stator that is positioned on the opposite side of the tooth part 30 in the stacking direction.

As described above, according to the present embodiment, the protecting member 40 for the stator is attached to the tooth part 30. The protecting member 40 for the stator protects the corner 39 of the tooth part 30, and instead, the protecting member 40 exposes the curved surface that is smooth in the winding direction of the electric wire 50 is wound. Accordingly, when the electric wire 50 is wound around the tooth part 30 via the protecting member 40 for the stator, the electric wire 50 is not pushed into the corner of the tooth part 30, so that the electric wire 50 is prevented from being broken. Accordingly, the degradation in the insulating performance and the electrical strength performance can be suppressed.

The protecting member 40 for the stator is formed to have a length in the slot 38 that is shorter than a half of the length of the tooth part 30. Accordingly, when the protecting member 40 for the stator is attached to each of the both end surfaces of the tooth part 30, it is unnecessary to insert the end portion 42 to the deep position in the slot 38. For this reason, the work efficiency is improved, and a work time can be shortened.

Furthermore, the protecting member 40 for the stator protects the corner of the tooth part 30. While the stator 1 is coated with resin, the resin coat can be made thin since the insulating performance at the corner 39 does not need to be taken into consideration. For example, when there is no protecting member 40 for the stator, the resin coat having a thickness of 100 μm is necessary. Meanwhile, the protecting member 40 for the stator can enhance the insulating performance at the corner 39, so that a thickness of the resin coat may be 10 μm. In accordance with a degree that the resin coat is made thinner, the slot 38 becomes wider, so that the electric wire 50 can be made thicker, or the number of times the electric wire 50 is wound can be increased. Thereby, the winding efficiency can be improved. When the thickness and the number of times the electric wire 50 is wound is not changed, a volume of the electric wire 50 occupying in the slot 38 is smaller to make an air more easily flow in the slot. Thereby, the heat radiation efficiency can be improved.

Furthermore, the protecting member 40 for the stator just covers the end surface regardless of the number of the stacked steel plates 10. Accordingly, even when a shape of the stator 1 is changed in the stacking direction, a shape of the protecting member 40 does not need to be changed. It is unnecessary to prepare various protecting members 40 for the stator 1 in conformity with the stator 1, so that the cost can be reduced.

MODIFIED EXAMPLE 1

In the above-described embodiment, an example of providing the U-shaped protecting member 40 for the stator is described. However, the present invention is not limited to this.

Figure 6:
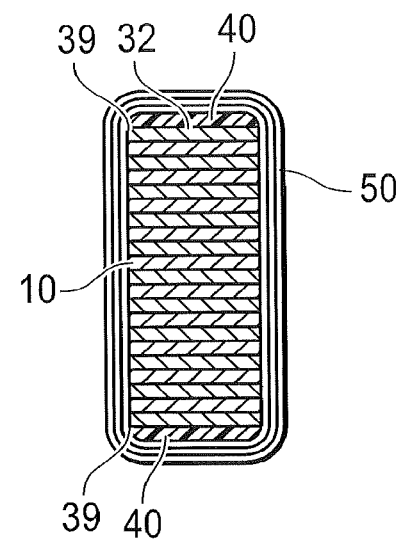
FIG. 6 illustrates a modified example of the protecting member for the stator.

FIG. 6 illustrates a modified example of the protecting member for the stator.

As illustrated in FIG. 6, the protecting member 60 including the end portions that are not inserted in the slot 38 (refer to FIG. 4) at all may be provided. According to such a configuration, the protecting member 60 for the stator does not enter the slot, so that a length of the protecting member 60 for the stator is zero in the area of the slot, and is shorter than the entire length of the tooth part 30.

As illustrated in FIG. 6, a width of the protecting member 60 for the stator is equal to a width of the tooth part 30, so that there are no spaces on the both sides of the tooth part 30, compared with FIG. 5. Accordingly, the space of the slot 38 can be more effectively used than in the embodiment of FIG. 5 to improve the winding efficiency, and the heat radiation efficiency.

MODIFIED EXAMPLE 2

In a modified example 2, wall portions 72 are provided at the inner position in the inward direction of the protecting member 70 for the stator and at the outer position in the outer direction thereof. The wall portions 72 extend from the protecting member 70 for the stator toward the outer side in the stacking direction.

Figure 7:
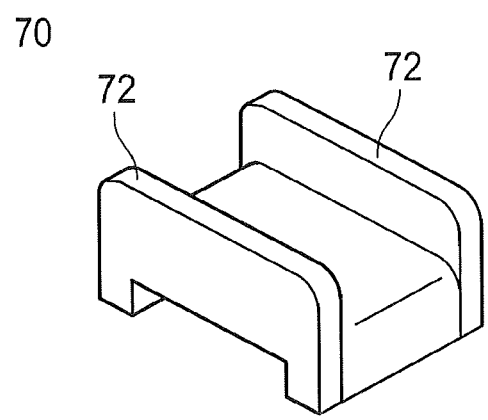
FIG. 7 illustrates another modified example of the protecting member for the stator.

FIG. 7 illustrates another modified example 2 of the protecting member for the stator.

As illustrated in FIG. 7, the protecting member 70 for the stator includes the wall portions 72. Providing the wall portions 72 prevents apart of the wound electric wire 50 from being displaced in the inward direction or in the outward direction of the tooth part 30 when the electric wire 50 is wound around the tooth part 30.

The present invention is not limited to the above-described embodiments, and may be modified variously within the scope of the claims.

The entire disclosure of Japanese Patent Application No. 2011-278701 filed on Dec. 20, 2011 including specification, claims, drawings and summary are incorporated herein by reference in its entirety.

What is claimed is:

1. A stator comprising:
a yoke part formed to be annular;
a plurality of tooth parts protruding from the yoke part in an inward direction perpendicular to an axial direction of a rotor when the rotor is arranged in the yoke part, each tooth part include a tooth winding portion configured to be wound with electric wire, and a tooth end portion extending in the inward direction and being wider than the tooth winding portion; and
a protecting member attached to both end surfaces of the tooth winding portion of at least one of the tooth parts in the axial direction to protect a corner of the tooth winding portion of the at least one of the tooth parts, the protecting member having a length in a slot between the tooth parts, shorter than a half of an entire length of the tooth parts in the axial direction, the protecting member being mounted on and protecting the tooth winding portion without covering the tooth end portion and the yoke part.

2. The stator according to claim 1, wherein the protecting member is located only on an outer side of the tooth parts in the axial direction.

3. The stator according to claim 1, wherein the protecting member comprises a plurality of protecting members, each mounted only on a corresponding tooth winding portion, and is formed to have U-shape bridging both slots adjacent to the tooth part, and end portions of the protecting member are located in the slots respectively.

4. The stator according to claim 3, wherein the protecting member has a wall portion preventing a part of the wound electric wire from being displaced in the inward direction or in the outward direction of the at least one of the tooth parts when the electric wire is wound around the at least one of the tooth parts.

5. The stator according to claim 4, wherein the wall portion is placed on the tooth winding portion.

6. The stator according to claim 1, wherein the yoke part and the tooth parts are formed by stacking a plurality of steel plates.

7. A protecting member for a stator, being attached to the stator including a yoke part formed to be annular, and including a plurality of tooth parts protruding from the yoke part in an inward direction perpendicular to an axial direction of a rotor when the rotor is arranged in the yoke part,
the protecting member comprises a plurality of protecting members, each being mounted only on a corresponding tooth winding portion at both end surfaces of one of the tooth parts in the axial direction to protect a corner of one of the tooth parts, the protecting member having a length in a slot between the tooth parts, shorter than a half of an entire length of the tooth parts in the axial direction;
wherein the protecting member does not cover the yoke part and does not cover an inward end of any tooth parts.

8. The protecting member for a stator according to claim 7, wherein the protecting member is formed to have U-shape bridging both slots adjacent to the tooth part, and end portions of the protecting member are located in the slots respectively.

* * * * *